(12) United States Patent
Shen et al.

(10) Patent No.: US 8,161,065 B2
(45) Date of Patent: Apr. 17, 2012

(54) FACILITATING ADVERTISEMENT SELECTION USING ADVERTISABLE UNITS

(75) Inventors: Dou Shen, Redmond, WA (US); Yi Zhang, Redmond, WA (US); Heng Zhang, Redmond, WA (US); Sahil Thaker, Issaquah, WA (US); Valeri Liborski, Woodinville, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/620,341

(22) Filed: Nov. 17, 2009

(65) Prior Publication Data

US 2011/0119255 A1    May 19, 2011

(51) Int. Cl.
*G06F 17/30* (2006.01)
(52) U.S. Cl. .................................................. 707/769
(58) Field of Classification Search ............. 707/3, 721, 707/769
See application file for complete search history.

(56) References Cited

U.S. PATENT DOCUMENTS

| 6,772,150 | B1 * | 8/2004 | Whitman et al. ............. 707/721 |
| 2006/0161541 | A1 | 7/2006 | Cencini | |
| 2007/0112764 | A1 | 5/2007 | Yih | |
| 2007/0143278 | A1 | 6/2007 | Srivastava | |
| 2007/0214050 | A1 | 9/2007 | Schoen | |
| 2007/0220037 | A1 | 9/2007 | Srivastava | |
| 2008/0016040 | A1 | 1/2008 | Jones | |
| 2008/0082477 | A1 | 4/2008 | Dominowska | |
| 2008/0243613 | A1 * | 10/2008 | Silvestri et al. ................. 705/14 |
| 2008/0249832 | A1 * | 10/2008 | Richardson et al. ............ 705/10 |
| 2008/0301093 | A1 | 12/2008 | Haugen | |

OTHER PUBLICATIONS

Chellapilla, Kumar, et al., "Improving Cloaking Detection Using Search Query Popularity and Monetizability," AIRWeb'06, Aug. 10, 2006, Seattle, Washington, USA, 7 pp.

* cited by examiner

*Primary Examiner* — Etienne Leroux
(74) *Attorney, Agent, or Firm* — Shook, Hardy & Bacon L.L.P.

(57) ABSTRACT

Systems, methods, and computer storage media having computer-executable instructions embodied thereon that facilitate advertisement selection using advertising units. An entity that is a sequence of two or more words is referenced. The entity includes substrings comprising a portion of the entity. Search data in association with the entity is compared to corresponding search data in association with the substrings of the entity. Based on the comparison, it is determined that the entity comprises an advertisable unit that functions as a unit for purposes of selecting an advertisement for display. The advertisable unit is used to select an advertisement to be presented to the user.

20 Claims, 5 Drawing Sheets

FACILITATING ADVERTISEMENT SELECTION USING ADVERTISABLE UNITS

BACKGROUND

Advertisements are commonly displayed in association with web content, such as a set of search results or a webpage. Selecting an advertisement for display in association with the web content is generally based on a user search query available at the time of advertisement delivery. Oftentimes, a phrase within a user search query is fragmented, and such fragmented portions are utilized to select an advertisement for display in association with the user search query. For example, assume a user enters a query "1-800-flowers." Further assume that the query is fragmented so that the word "flowers" is utilized to select advertisements to present to the user. Accordingly, advertisements generally related to flowers can be selected and presented. Such advertisements might be relevant or related to the user's interests and, thereby, provide the user with other flower sources that might be of interest to the user.

However, utilizing terms within a phrase, rather than the phrase as a unit, can result in a displayed advertisement that does not pertain to the current user interest. By way of example only, assume a user enters a query "Sleepless in Seattle." Further assume that such a query is fragmented so that "Sleepless" and/or "Seattle" is utilized to select advertisements to present to the user. In such a case, advertisements related to "Sleepless" and/or "Seattle" can be selected and presented to the user. As the user was searching for details regarding the movie "Sleepless in Seattle," advertisements related to "Sleepless" and/or "Seattle" are not likely to be relevant or related to the user's current interest.

SUMMARY

Embodiments of the present invention relate to systems, methods, and computer-readable media for, among other things, facilitating advertisement selection using advertisable units. An advertisable unit refers to a phrase that functions as a unit for purposes of selecting an advertisement for display. Utilizing an advertisable unit within a user search query to select an advertisement for display enables selection of an advertisement that is consistent with the user's interest. As such, a user can be presented with an advertisement of interest to the user. In implementation, a determination is made as to whether a phrase is an advertisable unit. In cases where a search query includes an advertisable unit, such an advertisable unit is utilized to select or identify an advertisement to present to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
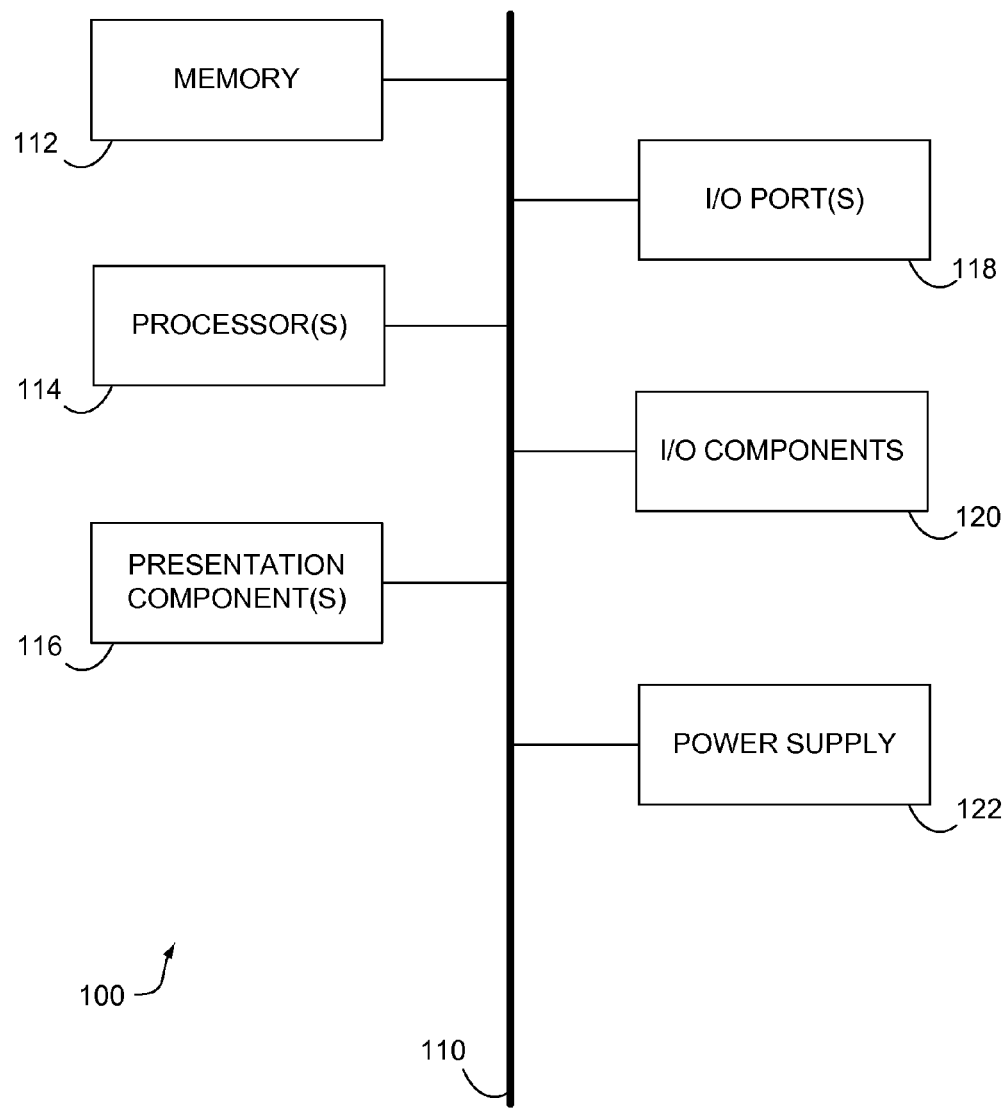
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that facilitate selecting an advertisement. Advertisable units are determined based on a comparison of search data associated with an entity and substrings corresponding therewith. Thereafter, advertisable units recognized within a user search query are used to select and/or identify one or more advertisements to display in connection with the user search query.

Accordingly, in one aspect, the present invention is directed to one or more computer storage media having computer-executable instructions embodied thereon, that when executed, cause a computing device to perform a method for facilitating advertisement selection using advertisable units. The method includes referencing an entity that is a sequence of two or more words. The entity has one or more substrings comprising a portion of the entity. Search data in association with the entity is compared to corresponding search data in association with the one or more substrings of the entity. Based on the comparison, it is determined that the entity is an advertisable unit that is a sequence of two or more words that functions as a unit for purposes of selecting an advertisement for display. The advertisable unit is used to select an advertisement to be presented to the user.

In another aspect, the present invention is directed to a system for facilitating advertisement selection using advertising units. The system includes an entity referencing component references an entity comprising a sequence of two or more words. An advertisable unit determining component determines that the entity is an advertisable unit that is a sequence of two or more words that functions as a unit for purposes of selecting an advertisement for display. The advertisable unit determining component compares search data associated with the entity to search data associated with each substring of the entity. An advertisement selecting component selects one or more advertisements to display to a user in accordance with the advertisable unit.

In yet another aspect, the present invention is directed to a computerized method for facilitating advertisement selection using advertising units. The method includes referencing an entity that is a sequence of two or more words from an entity data store or a user search query. The entity has substrings comprising a portion of the entity. Each substring has a click number, a set of clicked Uniform Resource Locators, and a set of search snippets. A click number of the entity is compared to a click number corresponding with each substring. A set of clicked Uniform Resource Locators associated with the entity is compared to a set of clicked Uniform Resource Locators corresponding with each substring. A set of search snippets associated with the entity is compared to a set of search snippets corresponding with each substring. Based on the comparisons, it is determined that the entity comprises an advertisable unit that is a sequence of two or more words functioning as a unit for purposes of selecting an advertisement for display. Such a determination is made when the click number of the entity exceeds the click number corresponding with each substring, the overlap between the set of clicked Uniform Resource Locators associated with the entity and the set of clicked Uniform Resource Locators corresponding with each substring is smaller than a click similarity threshold, or the similarity between the set of search snippets associated with the entity and the set of search snippets corresponding with each substring is smaller than a snippet similarity threshold. A user search query including the entity is received. The advertisable unit is used to select an advertisement to be presented to the user.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
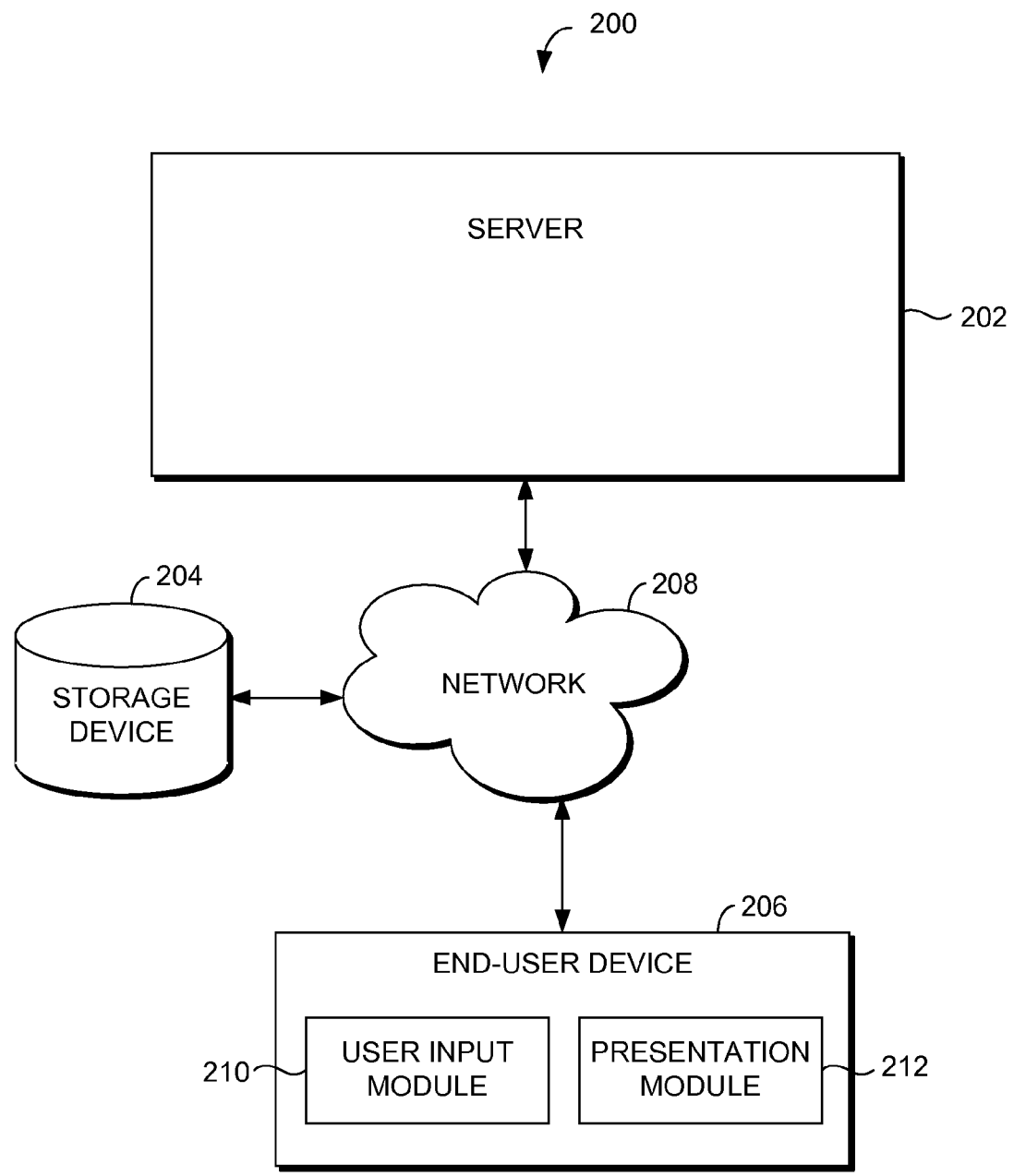
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, and an end-user device 206, all in communication with one another via a network 208. The network 208 may include, without limitation, one or more local area networks (LANs) and/or wide area networks (WANs). Such networking environments are commonplace in offices, enterprise-wide computer networks, intranets and the Internet. Accordingly, the network 208 is not further described herein.

The storage device 204 is configured to store information associated with advertisement selection. In various embodiments, such information may include, without limitation, entities, substrings, user queries, advertisements, advertisable units, and/or the like. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more entities, substrings, user queries, advertisements, advertisable units, and/or the like. The content and volume of such information are not intended to limit the scope of embodiments of the present invention in any way. Further, though illustrated as a single, independent component, the storage device 204 may, in fact, be a plurality of storage devices, for instance a database cluster, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft® Corporation headquartered in Redmond, Wash.

Components of server 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 208. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the server 202 is scalable. For example, the server 202 may in actuality include a plurality of servers in communication with one another. Moreover, the storage device 204 may be included within the server 202 or end-user device 206 as a computer-storage medium. The single unit depictions are meant for clarity, not to limit the scope of embodiments in any form.

As shown in FIG. 2, the end-user device 206 includes a user input module 210 and a presentation module 212. In some embodiments, one or both of the modules 210 and 212 may be implemented as stand-alone applications. In other embodiments, one or both of the modules 210 and 212 may be integrated directly into the operating system of the end-user device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input. Such input might include, for example, user search queries. Typically, input is input via a user interface (not shown) associated with the end-user device 206, or the like. Upon receiving input, the presentation module 212 of the end-user device 206 is configured for presenting advertisements, for example, in association with search results or a webpage. Embodiments are not intended to be limited to visual display but rather may also include audio presentation, combined audio/video presentation, and the like.

Figure 3:
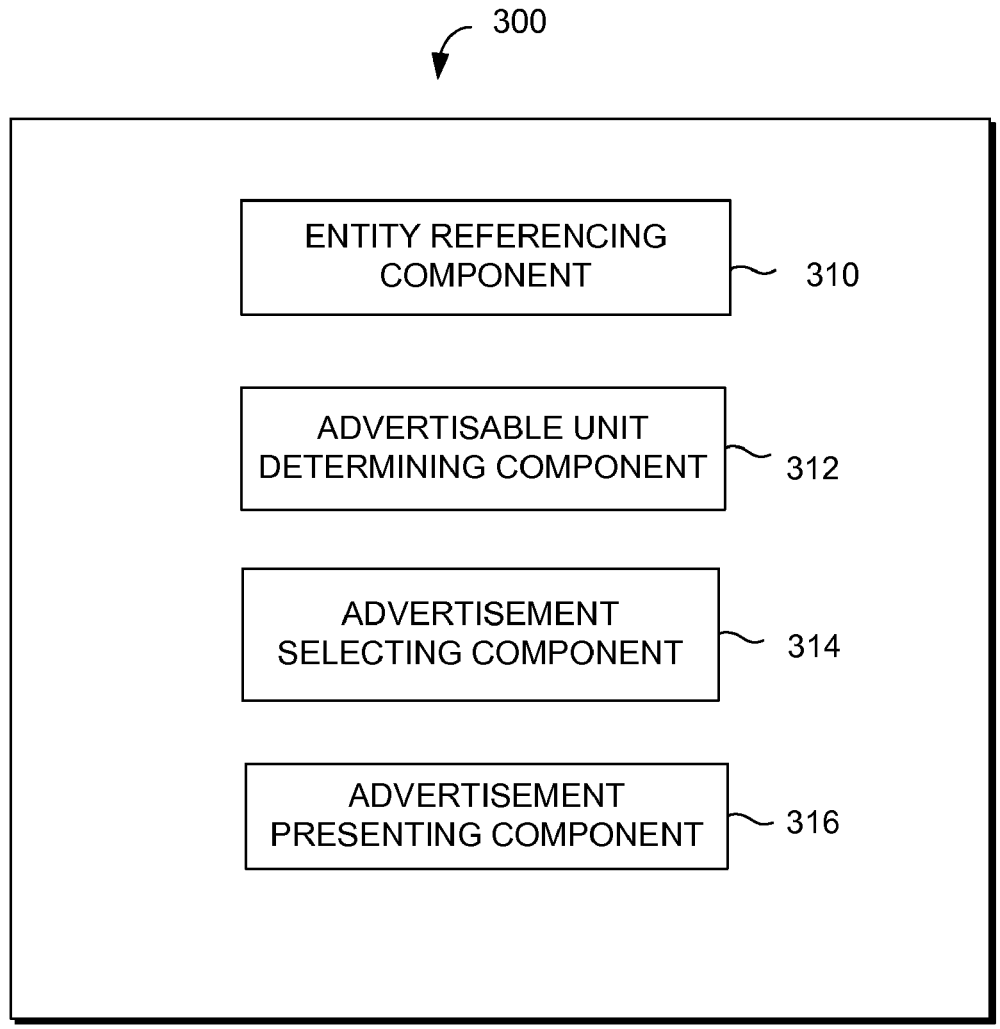
FIG. 3 is a block diagram of an exemplary computer system for use in implementing embodiments of the present invention.

FIG. 3 illustrates an exemplary computing system 300 for facilitating advertisement selection using advertisable units. An advertisable unit, as used herein, refers to a string (i.e., a sequence of symbols, characters, numbers, and/or letters) that functions as a unit for purposes of selecting an advertisement for display. In some cases, an advertisable unit includes at least one word among additional characters, numbers, and/or letters. In other cases, an advertisable unit is a sequence of two or more words that function as a unit for purposes of selecting an advertisement for display. In this regard, an advertisable unit that exists within a user search query is utilized to identify and/or select one or more advertisements that are of interest to the user (e.g., relevant to the user query).

As shown in FIG. 3, an exemplary computing system 300 includes an entity referencing component 310, an advertisable unit determining component 312, an advertisement selecting component 314, and an advertisement presenting component 316. In some embodiments, one or more of the illustrated components may be implemented as stand-alone applications. In other embodiments, one or more of the illustrated components may be integrated directly into the operating system of the server 202, a cluster of servers (not shown) and/or the end-user device 206. It will be understood by those of ordinary skill in the art that the components illustrated in FIG. 3 are exemplary in nature and in number and should not be construed as limiting. Any number of components may be employed to achieve the desired functionality within the scope of embodiments hereof. Further, components may be located on any number of servers or computing devices. By way of example only, the advertisement selecting component 314 and the advertisement presenting component 316 might reside on a server or cluster of servers remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The entity referencing component 310 is configured to reference a set of one or more entities. In this regard, an entity might be obtained, accessed, received, retrieved, recognized, determined, identified, or the like. An entity refers to a string (i.e., a sequence of symbols, characters, numbers, and/or letters). An entity might comprise at least a portion of a user search query. In some cases, an entity is a sequence of two or more words and may comprise or represent at least a portion of a user search query (e.g., Sleepless in Seattle). In other cases, an entity includes at least one word among other characters, letters, and/or numbers (e.g., 1-800-flowers). That is, an entity is a phrase that describes or represents at least a portion of a user interest. In embodiments, an entity is a recognized or known phrase. For example, an entity might be "1-800-flowers," "Sleepless in Seattle," "Pizza Hut," "New York," etc.

In some cases, one or more entities can be referenced in association with a user search query. By way of example only, an entity can be selected by a user or input as a user search query. Thereafter, such an entity can be referenced from the user search query. As can be appreciated, an entity can be an entire user search query or a portion thereof.

Alternatively or additionally, search queries and/or entities can be stored within an entity data store, such as a database. An entity data store can obtain search queries and/or entities based on, for instance, search queries or entities input into or recognized by a search engine. As such, an entity data store might collect search queries and/or entities input by a set of one or more users into a website associated with a search engine. An entity data store might similarly collect search queries and/or entities provided by one or more users, developers, and/or administrators for purposes of populating the database.

By way of further example, an entity data store might collect search queries and/or entities that are automatically generated or collected (e.g., using an algorithm or webcrawler to collect phrases). For instance, a webcrawler might locates entities, for example, from various web sources, such as Wikipedia.com. In another case, substrings of an entity might be provided to an entity data store as an entity, as discussed more fully below. Upon collecting search queries and/or entities in an entity data store, the entity referencing component 310 can reference entities stored therein.

The advertisable unit determining component 312 is configured to determine whether an entity is an advertisable unit. As previously mentioned, an advertisable unit refers to a string (e.g., two or more words) that functions as a unit for purposes of selecting an advertisement for display. In this regard, an entity is an advertisable unit if utilizing a portion of an entity (i.e., a substring of the entity) to select an advertisement results in selection of an advertisement that varies from the current interest of the user. As such, fragmenting, dividing, or separating an entity into portions or sections results in a varied meaning of the entity such that undesired advertisements might be displayed. For example, assume that the movie title "Sleepless in Seattle" is an entity entered by a user as a search query. If the entity is fragmented into substrings "Sleepless" or "Seattle," neither substring is related to or represents the entity "Sleepless in Seattle." Accordingly, the entity "Sleepless in Seattle" is considered an advertisable unit. In this regard, the words in the entity "Sleepless in Seattle" are treated as a unit to identify and/or select a relevant and appropriate advertisement for presenting to a user.

By contrast, consider the entity "1-800-flowers." If the entity is fragmented into substrings "1-800-" and "flowers," the substring "flowers" is related to, describes, or represents the entity "1-800-flowers." As such, "1-800-flowers" is not considered an advertisable unit. In this regard, the entity "1-800-flowers" can be fragmented, and the fragmented portion "flowers" can be used to identify and/or select a relevant and appropriate advertisement that pertains to the user's interest.

A determination of whether an entity is an advertisable unit can be made using a variety of functions or algorithms. Search data in association with an entity can be compared to search data in association with one or more substrings of the entity to determine whether an entity is an advertisable unit. In embodiments, a substring refers to a set of one or more words that is a substring, fragment, or portion of an entity. Accordingly, an entity can be fragmented or divided into substrings. For instance, assume that the entity "Sleepless in Seattle" is referenced. Such an entity can be fragmented into substrings "Sleepless in," "in Seattle," "Sleepless," "In," and "Seattle." Search data, as used herein, refers to any data that corresponds with search results presented in response to a user search query. By way of example, and not limitation, search data might include click numbers, click-through rates, clicked Uniform Resource Locators (URLs), search snippets, or the like.

In one embodiment, a determination of whether an entity is an advertisable unit can be made based on a comparison of an entity click number to corresponding substring click numbers (e.g., all substrings of an entity or a set of substrings of an entity). A click number, as used herein, refers to the number of clicks or user selection of any search result that are provided for a particular entity or substring. That is, a click number is the number of instances that any search result is selected in association with a particular entity or substring. As such, an entity click number refers to the number of clicks or user selections of any search result that exists for a particular entity, and a substring click number refers to the number of clicks or user selections of any search result that exists for a particular substring. As can be appreciated, a click number can be calculated or determined based on a number of clicks by a single user or a set of users. In some cases, a click number represents a number of clicks recognized during a predetermined time period.

By way of example only, assume that a user enters a search query of "New York" and, thereafter, selects a presented search result by clicking on a Uniform Resource Locator in association with a search result. Such a selection of a search result increases an entity click number for the entity "New York." Further assume that, at a later time, a user that desires to obtain information regarding New York enters a search query "New" and receives search results that are not meaningful to the user. Accordingly, the user does not click on any Uniform Resource Locators in association with the presented search results. In such a case, the substring click number is not increased. If users rarely search "New" or "York," the click numbers for such substrings will be much lower than the click number for the entity "New York." For instance, if no user searches for "York," then the substring click number is zero.

Search result selections and/or click numbers might be logged, for example, in a search data log. A search data log might, for example, contain user actions taken (e.g., a single user or multiple users) upon submitting a user search query. By way of example only, a search data log might record or include search result selections, advertisement selections, click numbers, click-through rates, or the like. In such a case, the advertisable unit determining component 312 can utilize or reference the search data log, for instance, to obtain click numbers.

Upon recognizing or referencing an entity click number and one or more substring click numbers, for example from a search data log, the entity click number is compared to the substring click numbers. In some cases, an entity click number is compared to each substring click number in association with the entity. In other cases, an entity click number is compared to a set of substring click numbers in association with the entity. In embodiments, if the entity click number exceeds (i.e., is greater than) each substring click number, then the entity is an advertisable unit. By way of example only, assume that an entity click number for "New York" within a particular time period is 1,000,000 while the substring click number for "New" is 200,000 and the substring click number for "York" is 25,000 within the same time period. In such a case, the entity click number (i.e., 1,000,000) is greater than each substring click number (i.e., 200,000 and 25,000). Accordingly, the entity "New York" is considered an advertisable unit and, as such, is considered a unit for purposes of identifying and/or selecting an advertisement. That is, the entity "New York" will not be fragmented or separated to identify or select an advertisement.

If, however, the entity click number is less than any substring click number, the entity is not considered an advertisable unit. Accordingly, in one embodiment, the entity is considered a non-advertisable unit. In other embodiments, the entity is further analyzed (e.g., using another method) to determine whether the entity is an advertisable unit. Other comparisons of an entity click number and substring click numbers are contemplated to be within the scope of embodiments of this invention. For example, for an entity to be considered an advertisable unit or a non-advertisable unit, an entity click number might need to be greater than or less, respectively, than substring click numbers by a predetermined extent.

Additionally or alternatively, a determination of whether an entity is an advertisable unit can be made based on an overlap or similarity of clicked Uniform Resource Locators (URLs) for an entity and substrings thereof. In this regard, a determination is made as to whether the same or similar URLs are selected (i.e., clicked) for an entity and substrings corresponding therewith. For instance, assume a user enters a query having the entity "Sleepless in Seattle movie" and, thereafter, selects a particular URL in association with a search result. Further assume that a user enters a query having the substring "Sleepless in Seattle," and, upon presentation of the search results, the user selects the same URL as selected in association with the entity "Sleepless in Seattle movie." Because the same URL was selected or clicked for the entity and substring, it can be determined that the entity "Sleepless in Seattle movie" is not an advertisable unit. In this regard, the entity "Sleepless in Seattle movie" can be fragmented into the substring "Sleepless in Seattle" to obtain the same results.

Search result selections might be logged, for example, in a search data log. In such a case, the advertisable unit determining component 312 can utilize or reference the search data log, for instance, to identify selected or clicked URLs in association with an entity(s) and selected or clicked URLs in association with a substring(s). Upon recognizing or referencing selected URLs for an entity and selected URLs for substrings, an overlap or similarity between the selected URLs for an entity and the selected URLs for substrings can be determined.

In embodiments, a click similarity threshold can be used to determine whether an entity is an advertisable unit. For example, in embodiments, if the overlap of entity clicked URLs and one or more substring clicked URLs exceeds a threshold, it is determined that the entity is not an advertisable unit (i.e., a non-advertisable unit). In some cases, clicked URLs for an entity are compared to clicked URLs for each substring of the entity. As such, for each substring, it is determined whether the number of entity clicked URLs that overlap with the particular substring clicked URLs exceeds a click similarity threshold. If the overlap between clicked URLs for an entity and clicked URLs for each sub string exceeds a click similarity threshold, it is determined that the entity is a non-advertisable unit. On the other hand, if the overlap between clicked URLs for an entity and clicked URLs for any substring is less than a click similarity threshold, the entity is determined to be an advertisable unit, or alternatively, further analysis might be required to determine whether the entity is an advertisable unit.

In other cases, clicked URLs for an entity are compared to clicked URLs for all substrings of the entity. As such, it is determined whether the number of entity clicked URLs that overlap with any sub string clicked URLs exceeds a click similarity threshold. If the overlap between clicked URLs for an entity and clicked URLs for the substrings exceeds a click similarity threshold, it is determined that the entity is a non-advertisable unit. If, however, the overlap between clicked URLs for an entity and clicked URLs for the substrings is less than a click similarity threshold, it is determined that the entity is an advertisable unit, or alternatively, further analysis might be required to determine whether the entity is an advertisable unit.

Search result snippets can additionally or alternatively be used to make a determination of whether an entity is an advertisable unit. In this regard, search result snippets for an entity and search result snippets for one or more substrings are collected, for example, from a database. A search result snippet, as used herein, refers to a snippet or a summary presented in association with a search result. A search result snippet summarizes web content or provides text that matches or corresponds with a user search query. Upon collecting search result snippets that would be presented in association with an entity or substrings thereof, a similarity between entity snippets and substring snippets can be calculated or determined.

In embodiments, a snippet similarity threshold can be used to determine whether an entity is an advertisable unit. For example, in embodiments, if the similarity (e.g., similarity score) between a search result snippet in association with an entity and a search result snippet in association with any substring exceeds a snippet similarity threshold, it can be determined that the entity is not an advertisable unit. If, however, the similarity (e.g., similarity score) between an entity snippet and each substring snippet is less than a snippet similarity threshold, it can be determined that an entity is an advertisable unit, or alternatively, further analysis might be required to determine whether the entity is an advertisable unit. For example, assume that the entity "1-800-flowers" is input as a user search query and that search results pertaining to 1-800-flowers as well as search results pertaining to flowers generally are provided. Further assume that the search results are very similar to search results provided when the substring "flowers" is input as a user search query. In such a case, a similarity, for example identified by a similarity score, that exceeds a snippet similarity threshold is recognized and, accordingly, it is determined that the entity "1-800-flowers" is not an advertisable unit. A similarity score can be utilized to identify similarity between an entity snippet and a substring snippet. Such a similarity score can be based on, for example, a number of common terms, extent of common or similar content, etc.

Regardless of the method used to determined whether an entity is an advertisable unit, advertisable units and/or non-advertisable unit might be listed as such in a data store(s) that contains a list of advertisable and/or non-advertisable units. Such a data store(s) can be referenced to identify whether an entity is an advertisable unit and might prevent duplicating an analysis of whether an entity is an advertisable unit. In cases where it is determined that an entity is not an advertisable unit, one or more substrings of the entity might be added as an entity to a data store, such as the entity data store. Upon a substring being added as an entity within a data store, the added entity can be referenced and analyzed to determine whether such a phrase is an advertisable unit. In some cases, a substring might only be added to a data store if the substring comprised two or more words.

The advertisement selecting component 314 is configured to select one or more advertisements for presenting to a user. Such advertisements can be displayed in association with a set of search results or a webpage. In embodiments, the advertisement selecting component 314 uses the advertisable units determined by the advertisable unit determining component 312 to select an advertisement(s). As such, an advertisable unit is utilized in its entirety to identify and/or select an advertisement. That is, a portion of an advertisable unit is not utilized for advertisement selection.

By way of example only, assume that it is determined that the entity "Sleepless in Seattle" is an advertisable unit. Further assume that a user inputs the entity "Sleepless in Seattle" into a website in association with a search engine. In such a case, the advertisement selecting component 314 might recognize that the entity "Sleepless in Seattle" is an advertisable unit and, thereafter utilize the advertisable unit to facilitate selecting or determining an advertisement to present to a user. Because the phrase is treated as an advertisable unit, the advertisement selecting component 314 will not select an advertisement pertaining to "Sleepless" or "Seattle." Rather, the user will be presented with advertisements relevant to the advertisable unit and the intended user query. By contrast, assume that it is determined that "1-800-flowers" is not an advertisable unit. In such a case, if "1-800-flowers" is entered into a search query, the substring "flowers" might be used to select an advertisement. Accordingly, a user can be presented with an advertisement pertaining generally to flowers in addition to advertisements related to 1-800-flowers.

In one embodiment, a data store, such as the storage device of FIG. 2, might be utilized to identify or recognize advertisable units. In this regard, one or more advertisable units can be obtained or referenced from a data store. As such, an advertisable unit might be located or looked up within a data store to recognize whether an entity, a search query, or a portion thereof, is considered an advertisable unit. A query or lookup can be performed to determine if a phrase is contained within the database. In some embodiments, advertisable units might be identified as such in association with an entity data store. Accordingly, an entity within an entity data store that is determined to be an advertisable unit might be identified or indicated as such.

In some cases, an advertisable unit is determined in real-time. In this regard, upon a user entering a user search query, it can be determined whether an entity in association therewith is an advertisable unit. In such a case, if it is determined that an entity is an advertisable unit, the advertisement selecting component 314 can utilize the advertisable unit to identify and/or select an advertisement for display. As can be appreciated, an indication of an advertisable unit or non-advertisable unit can be returned to an advertisement delivery engine that utilizes such advertisable units to determine an advertisement(s) to display.

An advertisement presenting component 316 is configured to present an advertisement in association with the advertisement context. As such, the advertisement presenting component 316 might present an advertisement in association with a search query, a search results page, a webpage, or the like. In some cases, the advertisements being presented are paid advertisements. Advertisement presenting component 316 might display and/or provide audio output to present one or more advertisements.

Figure 4:
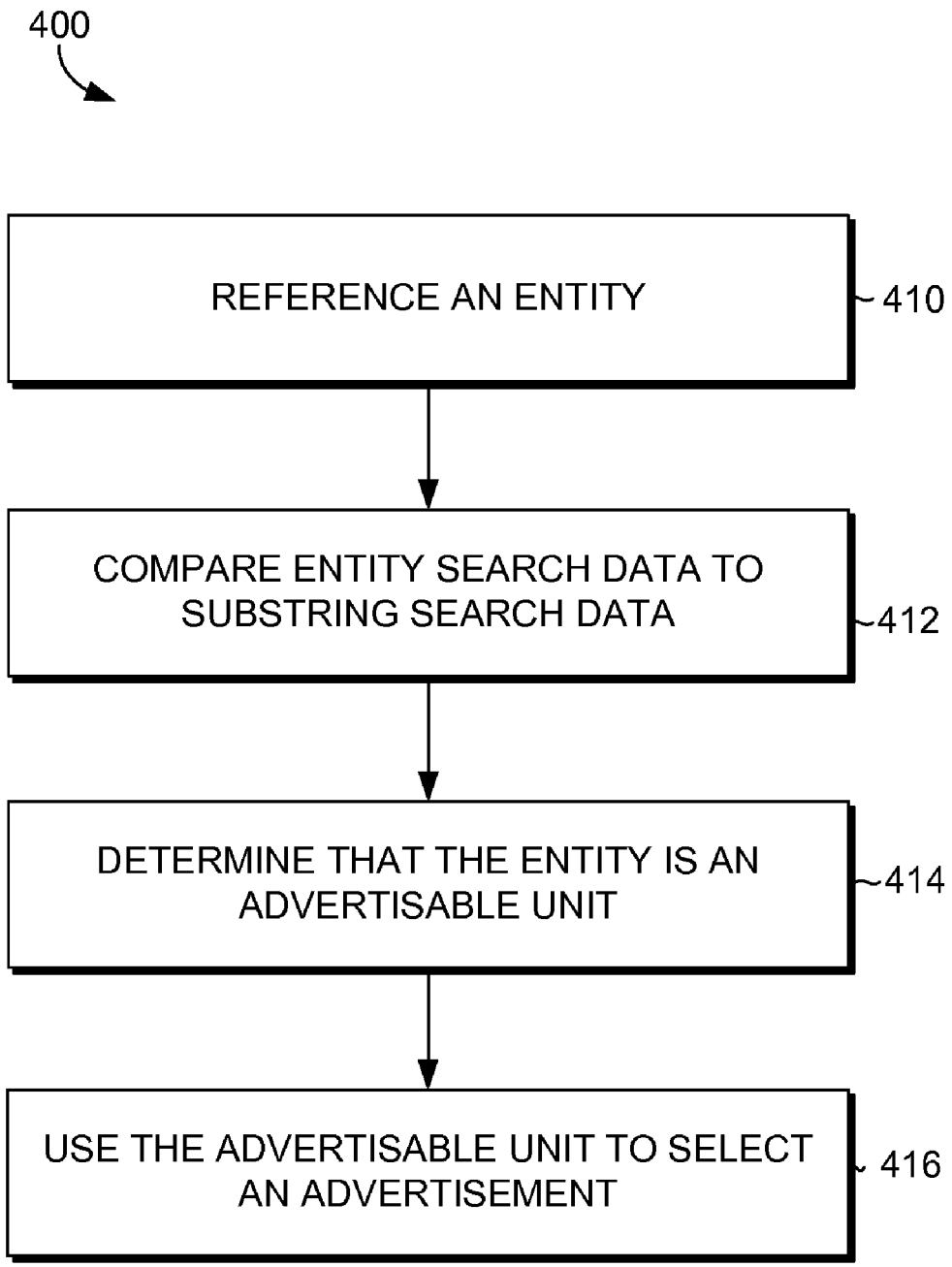
FIG. 4 is a flow diagram showing a first method for facilitating advertisement selection using advertisable units, in accordance with an embodiment of the present invention.

Turning now to FIG. 4, a flow diagram is illustrated which shows a first method 400 for facilitating advertisement selecting using advertisable units, in accordance with an embodiment of the present invention. Initially, at block 410, an entity is referenced. Such an entity might be a sequence of two or more words. The entity includes one or more substrings comprising a portion of the entity. Subsequently, at block 412, search data in association with the entity is compared to search data in association with the substrings of the entity. At block 414, it is determined that the entity is an advertisable unit. The advertisable unit is a string (e.g., a sequence of two or more words) that functions as a unit for purposes of selecting an advertisement for display. The advertisable unit is used to select an advertisement to be presented to the user. This is indicated at block 416.

Figure 5:
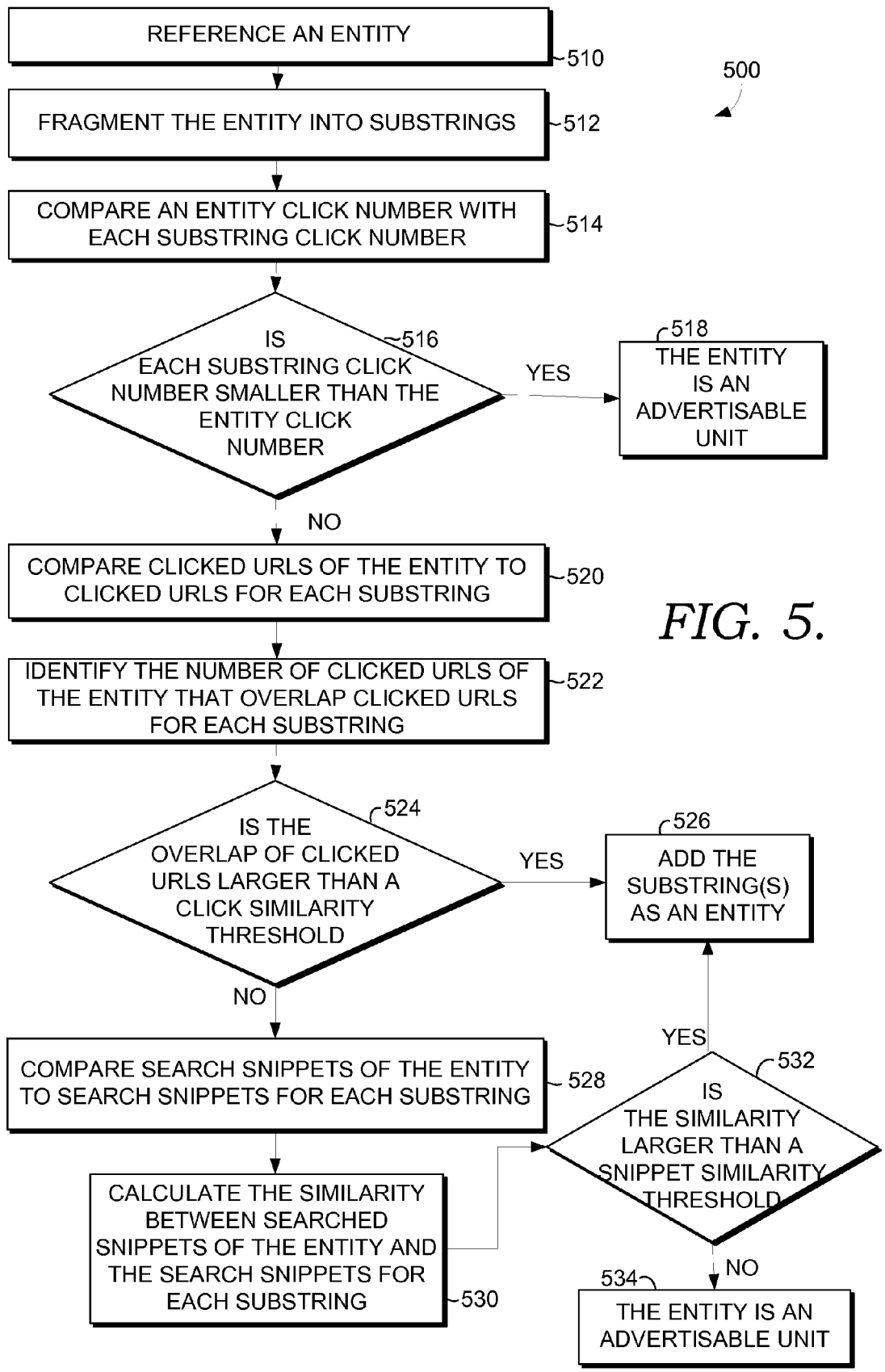
FIG. 5 is a flow diagram showing a second method for facilitating advertisement selection using advertisable units, in accordance with an embodiment of the present invention.

With reference to FIG. 5, a flow diagram is illustrated which shows a second method 500 for facilitating advertisement selecting using advertisable units, in accordance with an embodiment of the present invention. Initially, as indicated at block 510, an entity is referenced. An entity can be referenced, for example, from an entity data store or a user search query. At block 512, the entity is fragmented into substrings. At block 514, a click number in association with the entity is compared to each substring click number (i.e., a click number associated with a substring). Subsequently, at block 516, it is determined if each substring click number is smaller than the entity click number. If it is determined that each substring click number is smaller than the entity click number, then the entity is identified as an advertisable unit, as indicated at block 518.

If, on the other hand, it is determined that any substring click number is larger than the entity click number, at block 520, clicked URLs of the entity are compared to clicked URLs for each substring. At block 522, the number of clicked URLs that overlap clicked URLs for each substring is identified. Thereafter, for each substring, it is determined if the overlap of the clicked URLs is larger than a click similarity threshold. This is indicated at block 524. If it is determined that the overlap of the clicked URLs is larger than a click similarity threshold for each substring, one or more of the substrings are added as an entity, as indicated at block 526. On the other hand, if it is determined that the overlap of the clicked URLs is smaller than a click similarity threshold for any substring, search snippets in association with the entity are compared to search snippets in association with the substrings. This is indicated at block 528.

At block 530, the similarity between searched snippets of the entity and search snippets for each substring are calculated. Subsequently, at block 532, it is determined if the similarity is larger than a snippet similarity threshold. If it is determined that the similarity is smaller than a snippet similarity threshold, the entity is identified as an advertisable unit, as indicated at block 534. If, however, it is determined that the similarity is larger than a snippet similarity threshold for each substring, one or more of the substrings are added as an entity. This is indicated at block 526.

It will be understood by those of ordinary skill in the art that the order of steps shown in the method 400 of FIG. 4 and the method 500 of FIG. 5 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media having computer-executable instructions embodied thereon, that when executed, cause a computing device to perform a method for facilitating advertisement selection using advertisable units, the method comprising:
    referencing an entity that is a sequence of two or more words, the entity having one or more substrings comprising a portion of the entity;
    comparing search data in association with the entity to corresponding search data in association with the one or more substrings of the entity, the search data comprising data that corresponds with search results presented in response to one or more user search queries;
    based on the comparison of the search data associated with the entity and the one or more substrings of the entity, determining that the entity comprises an advertisable unit that is a sequence of two or more words that functions as a unit for purposes of selecting an advertisement for display; and
    using the advertisable unit to select an advertisement to be presented to the user.

2. The one or more computer storage media of claim 1 further comprising displaying the selected advertisement via a computing device to the user.

3. The one or more computer storage media of claim 2, wherein the selected advertisement is displayed in association with a set of search results.

4. The one or more computer storage media of claim 1, wherein the entity is referenced from an entity data store having a set of one or more entities.

5. The one or more computer storage media of claim 1, wherein the entity is referenced from a user search query.

6. The one or more computer storage media of claim 1, wherein the search data in association with the entity comprises an entity click number that indicates the number of instances a search result has been selected in association with the entity, and the search data in association with the one or more substrings of the entity comprises a substring click number for each of the one or more substrings that indicates the number of instances a search result has been selected in association with each of the one or more substrings.

7. The one or more computer storage media of claim 6, wherein it is determined that the entity comprises an advertisable unit when the entity click number exceeds the substring click number for each of the one or more substrings.

8. The one or more computer storage media of claim 1, wherein the search data in association with the entity comprises a set of search results selected in response to the entity, and the search data in association with the one or more substrings of the entity comprises a set of search results for each of the one or more substrings selected in response to each of the one or more substrings.

9. The one or more computer storage media of claim 8, wherein it is determined that the entity comprises an advertisable unit when the overlap between the set of search results selected in response to the entity and the set of search results for each of the one or more substrings selected in response to each of the one or more substrings is less than a click similarity threshold.

10. The one or more computer storage media of claim 1, wherein the search data in association with the entity comprises a set of search result snippets presented in response to the entity, and the search data in association with the one or more substrings of the entity comprises a set of search result snippets for each of the one or more substrings presented in response to each of the one or more substrings.

11. The one or more computer storage media of claim 10, wherein it is determined that the entity comprises an advertisable unit when the similarity between the set of search results selected and the set of search results for each of the one or more substrings is less than a snippet similarity threshold.

12. The one or more computer storage media of claim 1 further comprising recognizing the entity within a user search query.

13. A system for facilitating advertisement selection using advertising units, the system comprising:
    an entity referencing component that references an entity comprising a sequence of two or more words;
    an advertisable unit determining component that determines that the entity is an advertisable unit that is a sequence of two or more words that functions as a unit for purposes of selecting an advertisement for display, the advertisable unit determining component comparing search data associated with the entity to search data associated with each substring of the entity to make the determination, the search data comprising at least one of click numbers, click-through rates, clicked Uniform Resource Locators, or search snippets that correspond with search results presented in response to one or more user search queries;
    an advertisement selecting component that selects one or more advertisements to display to a user in accordance with the advertisable unit.

14. The system of claim 13, wherein the entity is referenced from an entity data store or a user search query.

15. The system of claim 13 further comprising an advertisement presenting component that presents the one or more advertisements.

16. The system of claim 13, wherein the selected advertisement is presented in association with a set of search results.

17. The system of claim 13, wherein the search data comprises at least one of click numbers, clicked Uniform Resource Locators, and search result snippets.

18. The system of claim 13, wherein an indication that the entity is an advertisable unit is stored in a data store.

19. A computerized method for facilitating advertisement selection using advertising units, the method comprising:
   referencing an entity that is a sequence of two or more words from an entity data store or a user search query, the entity having substrings comprising a portion of the entity, each substring having a click number, a set of clicked Uniform Resource Locators, and a set of search snippets;
   comparing a click number of the entity to a click number corresponding with each substring;
   comparing a set of clicked Uniform Resource Locators associated with the entity to a set of clicked Uniform Resource Locators corresponding with each substring;
   comparing a set of search snippets associated with the entity to a set of search snippets corresponding with each substring;
   based on the comparisons, determining that the entity comprises an advertisable unit that is a sequence of two or more words functioning as a unit for purposes of selecting an advertisement for display when at least one of the click number of the entity exceeds the click number corresponding with each substring, the overlap between the set of clicked Uniform Resource Locators associated with the entity and the set of clicked Uniform Resource Locators corresponding with each substring is smaller than a click similarity threshold, and the similarity between the set of search snippets associated with the entity and the set of search snippets corresponding with each substring is smaller than a snippet similarity threshold;
   receiving a user search query including the entity; and
   using the advertisable unit to select an advertisement to be presented to the user.

20. The computerized method of claim 19, further comprising displaying the advertisement to the user in association with search results.

\* \* \* \* \*